…

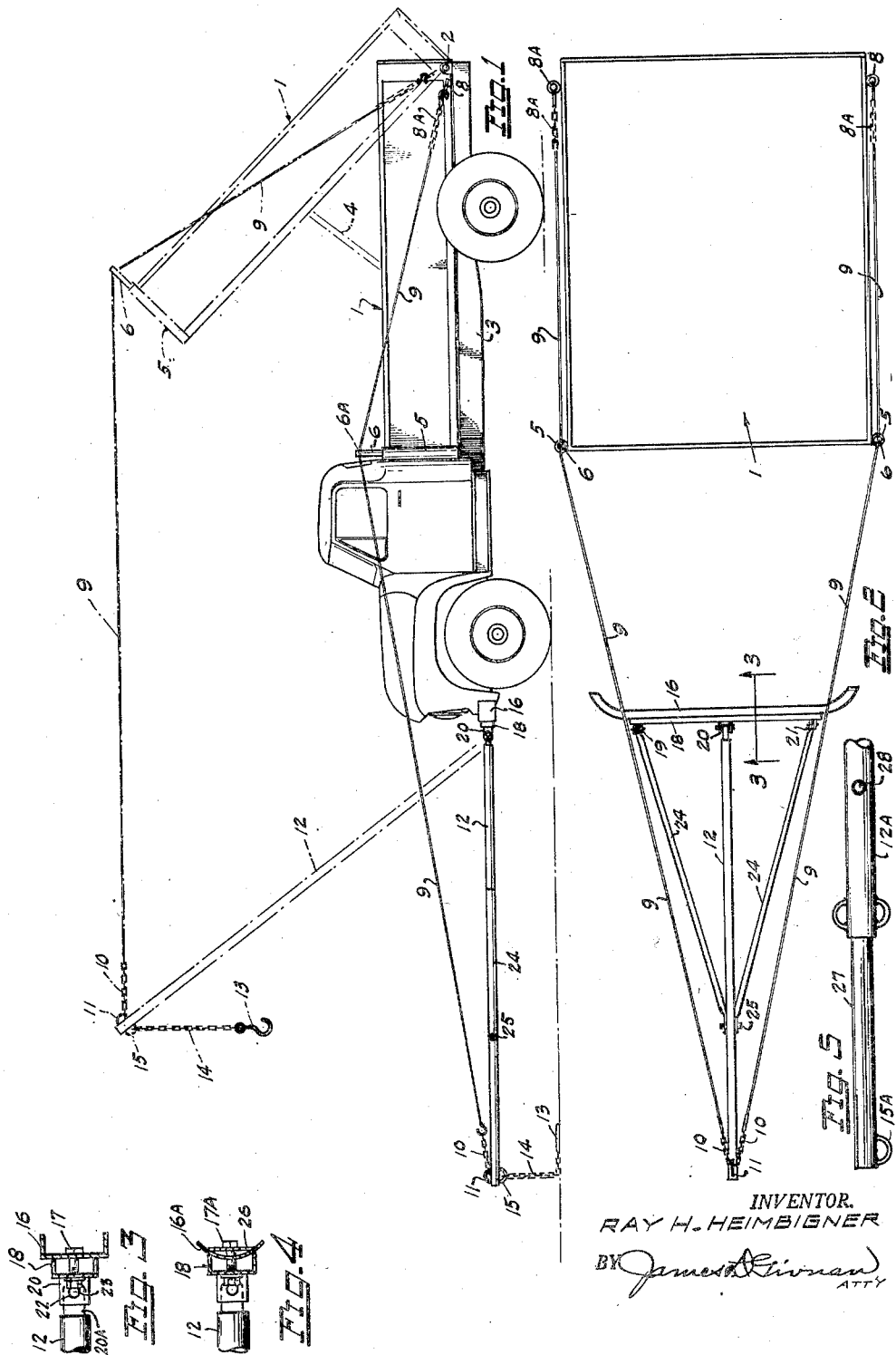

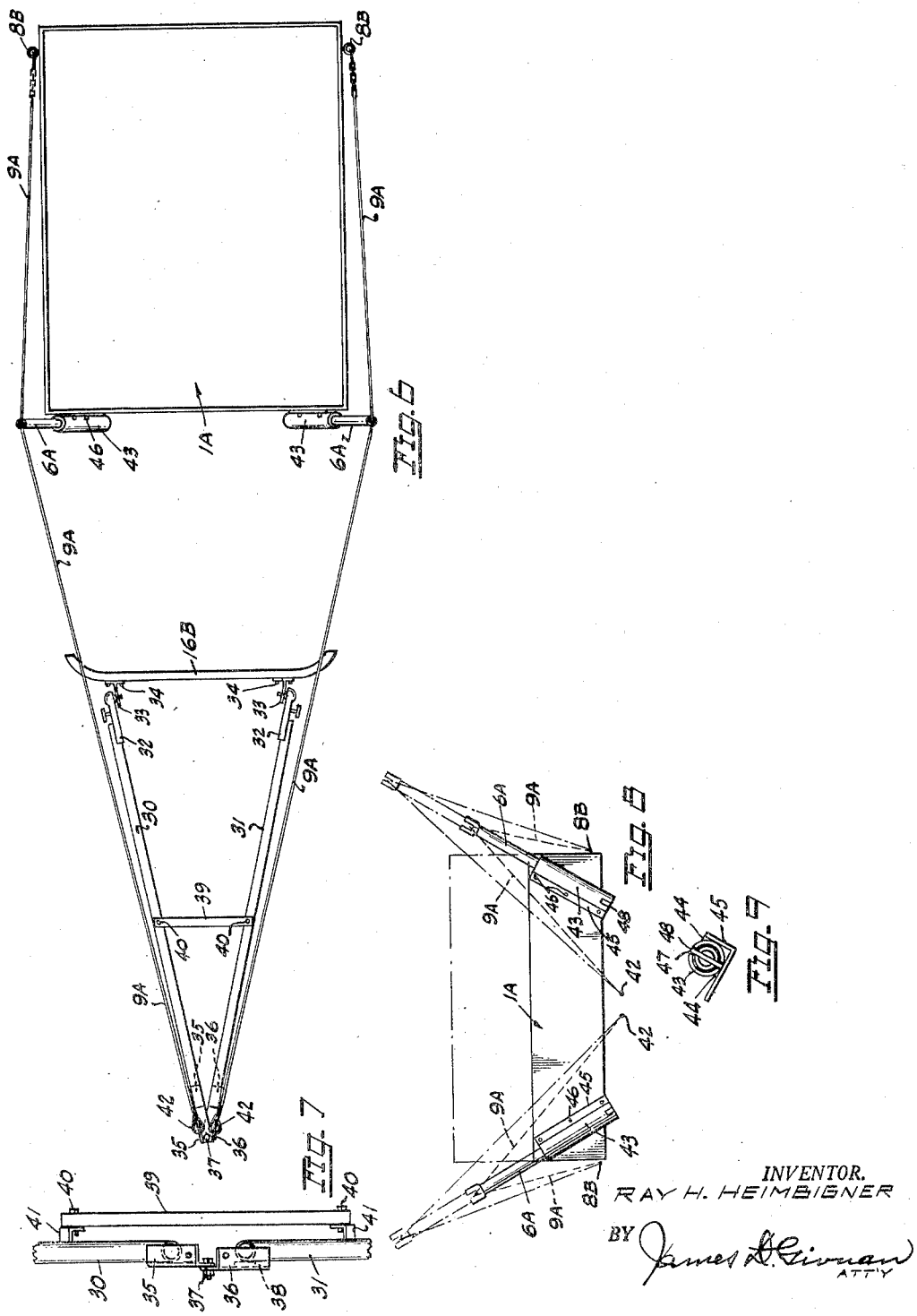

United States Patent Office 2,818,981
Patented Jan. 7, 1958

2,818,981

LIFTING BOOM AND MEANS FOR OPERATIVE ATTACHMENT TO A VEHICLE

Ray H. Heimbigner, Ione, Oreg.

Application June 20, 1955, Serial No. 516,705

1 Claim. (Cl. 212—8)

This invention relates to improvements in dump trucks and more particularly to an attachment therefor in the form of a lifting boom adapted to be swingably attached to the forward end or bumper of a dump truck and operatively connected by cables to the dump body whereby upward and rearward tilting of the dump body will swing the boom accordingly.

It is one of the principal objects of the invention to provide a lifting boom attachment of this character which is of simple, efficient, durable, and inexpensive construction which can be readily attached to a wide range of sizes and types of dump trucks and capable of safely lifting and transporting heavy loads.

The foregoing and other objects will appear as my invention is more fully hereinafter described in the following specification, illustrated in the accompanying drawings, and finally pointed out in the appended claim.

In the accompanying drawings:

Figure 1 is a side view of a dump truck equipped with a lifting boom made in accordance with my invention. For convenience in illustrating a central fitting on the front bumper of the truck I have broken away a fragment of a boom-stabilizing strut and its bumper attachment.

Figure 2 is a top plan view of the lifting boom showing its hinged attachment to the front bumper of the truck and its cable connections to the front and rear corners of the truck body.

Figure 3 is an enlarged sectional detail view taken along the lines 3—3 of Figure 2.

Figure 4 is an enlarged sectional detail view of a modified form of bumper attachment.

Figure 5 is an enlarged detail view of an extension boom adjustably and removably secured to the main boom, of which only a fragment is shown.

Figure 6 is a top plan view of a modified form of the invention.

Figure 7 is an enlarged fragmentary front end view of Figure 6 with cables and thimbles removed.

Figure 8 is a front view of the truck body shown in Figure 6 with the cables shown diagrammatically in broken and dotted lines.

Figure 9 is an enlarged detail view of the bottom end of a mast and supporting means therefor.

Referring now more particularly to the drawings:

The truck shown in Figure 1 is equipped with a standard dump body, indicated by reference numeral 1, hingedly attached as at 2 to the rear end of the chassis 3 in the usual manner and adapted to be raised and lowered by a conventional hydraulic hoist, the lifting arms of which are indicated at 4. To the forward corners of the truck body I secure a pair of vertical pipes 5 by welding or the like. Removably but firmly disposed within each pipe 5 and extending upwardly therefrom is a mast 6 having a horizontal opening or groove 6A formed in its top end. To the bottom rear corners of the truck body I secure a pair of rings 8 to which are hooked as shown the ends of chains 8A whose opposite ends are secured to the terminal ends of cables 9 which extend forwardly through the openings in the tops of the masts and terminate at their forward ends in hooked engagement with a chain 10 removably attached to a yoke 11 welded to the forward end of a lifting boom 12 which is preferably made of steel pipe. A pair of load hooks 13 are attached to the ends of a chain 14 extending through a yoke 15 welded to the underside of the boom beneath the yoke 11.

As best shown in Figure 3, wherein the front bumper 16 of the truck is of channel section, I removably secure by bolts 17 a channel iron 18. Welded to the channel iron and extending forwardly therefrom are three pairs of spaced apart plates 19, 20 and 21.

Welded to the rearward or opposite end of the boom 12 is a fitting 20A formed with an opening 22 by means of which the boom is swingably attached to the central pair of plates 20 by a bolt 23 extending therethrough. In like manner the rearward ends of stabilizing struts 24 are swingably attached to the pairs of plates 19 and 21. The forward ends of the struts are secured to the boom by a bolt 25.

For securing the channel iron 18 to a bumper 16A of arcuate shape in cross-section I provide a backing plate 26 through which the bolt 17A extends. The backing plate is of a width substantially equal to that of the channel iron 18 to prevent distorting the profile of the bumper when the channel iron is secured thereto.

In Figure 5 I have shown an extension boom 27 slidably mounted within the main boom 12A and lockable in adjusted positions with respect thereto by a bolt 28 extending to the interior of the main boom and engageable with the extension boom. The outer end of the extension boom 27 is provided with a yoke 15A on its underside to serve the same purpose as the yoke 15 on the form of boom shown in Figure 1.

In the modification shown in Figure 6 I provide a boom comprising a pair of forwardly converging steel pipes 30 and 31 each welded or otherwise secured at its rearward end to any approved type of trailer hitch 32 including a bracket 33 bolted as at 34 to the bumper 16B. As best shown in Figure 7 the forward end of each boom pipe 30 and 31 is welded or otherwise secured to an angle iron 35 and 36, respectively. The forward overlapping ends of the angle irons are bolted together as at 37 and due to the overlap I provide a spacer block 38 between the outer end of the pipe 31 and the horizontal flange of its respective angle iron 36 so that both pipes will lie in the same horizontal plane. The pipes are also interconnected intermediate their ends by a cross brace preferably in the form of a pipe 39 bolted at its ends at 40 to angle pieces 41 welded to the boom pipes. The cables 9A are hooked as at 8B to the bottom rear corners of the truck body 1A, extend forwardly over the tops of masts 6A and terminate in thimbles 42 by means of which they are attached to the angle irons 35 and 36 at the forward end of the boom pipes. As shown in Figures 6 and 8 the masts 6A instead of being vertically arranged as in the other form of the invention extend upwardly and outwardly from the forward end of the truck body so that the cables will clear the cab, hood and front fenders of trucks of greater widths. The angle at which the masts are arranged is such that the triangles of forces applied to them will impose only a compression load and thus stabilize the masts against inward or outward deflection. In other words, and as best illustrated in Figure 8, the downward and inward pull of the cable from the top of the mast to its point of attachment 42 to the forward end of the boom is offset by its downward and outward pull from the top of the mast to its point of attachment 8B to the outside rear corner of the truck body.

In Figure 8 it will also be observed that masts of various heights may be used, for example, as represented by full and broken lines. The masts are carried by pipes 43 welded as at 44 to angle irons 45 secured by bolts 46 or any other suitable means to the front wall of the truck body. The bottom end of each pipe 43 is slotted inwardly as at 47 to receive a cross bar 48 welded in place to provide a support at the bottom end of the pipe for its respective mast.

From the foregoing and with reference to Figures 1, 6 and 8 it will be apparent that when either dump body 1 or 1A is tilted rearwardly about its hinged mounting to the truck chassis by the hydraulic hoist the resultant rearward pull on the cables 9 or 9A will swing its respective boom upwardly about its hinged bumper attachment 20—20A or 32. It is to be understood, of course, that booms of different lengths could be used instead of the extension boom of Figure 5 to meet the requirements of various loads and height of lift.

While I have shown a particular form of embodiment of my invention I am aware that many minor changes therein will readily suggest themselves to others skilled in the art without departing from the spirit and scope of the invention.

Having thus described my invention what I claim as new and desire to protect by Letters Patent is:

An attachment for a truck having a driver's cab, a forward bumper and a power actuated dump body, comprising in combination a pair of masts removably secured to the forward corners of the dump body, a main lifting boom swingably attached at its rear end to said bumper and extending forwardly therefrom, an extension boom adjustably attached to the forward end of the main lifting boom, a pair of cables attached to the forward end of the main lifting boom and extending rearwardly over and supported by said masts, the rearmost ends of said cables being attached to the bottom rear corners of the dump body, whereby upward and rearward tilting of the dump body will impart a corresponding upward swing to the boom, each of said masts extending upwardly and outwardly from said forward corners of the dump body to a height where the distance between their top ends is greater than the width of the cab whereby said cables will clear the cab throughout their operative range, the angle of upward and outward extension of each mast being such that the downward and inward pull of its respective cable from the top of the mast to its point of attachment to said boom is offset by the downward and outward pull of the cable from the top of the mast to its point of attachment to said bottom rear corners of the dump body, whereby said masts are under compression at all times and thereby stabilized against deflection.

References Cited in the file of this patent
UNITED STATES PATENTS

| | | |
|---|---|---|
| 2,244,559 | Lawton | June 3, 1941 |
| 2,406,620 | Luckett | Aug. 27, 1946 |
| 2,495,143 | Simmonds | Jan. 17, 1950 |